United States Patent
Wylie et al.

(10) Patent No.: US 8,083,207 B1
(45) Date of Patent: Dec. 27, 2011

(54) APPARATUS FOR GATE VALVE MOVEMENT IN A MINIMUM-SPACE WET PROCESS ENVIRONMENT

(75) Inventors: Jacob Wylie, San Diego, CA (US); Gregory A. Clemmer, Fremont, CA (US); Alan M. Schoepp, Ben Lomond, CA (US)

(73) Assignee: Lam Research Corporation, Fremont, CA (US)

( * ) Notice: Subject to any disclaimer, the term of this patent is extended or adjusted under 35 U.S.C. 154(b) by 510 days.

(21) Appl. No.: 12/269,020

(22) Filed: Nov. 11, 2008

Related U.S. Application Data

(60) Provisional application No. 61/002,995, filed on Nov. 13, 2007.

(51) Int. Cl.
*F16K 25/00* (2006.01)
(52) U.S. Cl. ........................... 251/193; 251/175
(58) Field of Classification Search ............... 251/175, 251/193, 326
See application file for complete search history.

(56) References Cited

U.S. PATENT DOCUMENTS

| | | | | |
|---|---|---|---|---|
| 5,975,492 A | * | 11/1999 | Brenes | 251/175 |
| 6,056,266 A | * | 5/2000 | Blecha | 251/158 |
| RE38,318 E | * | 11/2003 | Brenes | 251/175 |
| 7,762,527 B2 | * | 7/2010 | Schoen et al. | 251/193 |

* cited by examiner

*Primary Examiner* — John Fristoe, Jr.
(74) *Attorney, Agent, or Firm* — Martine Penilla Group, LLP

(57) ABSTRACT

Improved gate movement is provided in a wet process environment in which fluid collecting from a gate occurs adjacent to an access opening provided in a wall of a process chamber while the gate is moved relative to the opening. A minimum space environment is adjacent to the chamber due to a requirement for fluid collection next to the opening, yet the gate movement is provided without interference with a wafer transfer unit that moves the wafer through the access opening. Drives are configured within the minimum space environment to move the gate into and out of alignment with the opening and when aligned, to move the gate into and out of a gate closure position. The configuration of the drives avoids interference with the wafer transfer unit and the gate is received in a fluid collector during the gate movement to provide fluid collection during the wafer transfer.

14 Claims, 8 Drawing Sheets

APPARATUS FOR GATE VALVE MOVEMENT IN A MINIMUM-SPACE WET PROCESS ENVIRONMENT

CLAIM OF PRIORITY

This application claims the priority of U.S. Provisional Application No. 61/002,995, filed on Nov. 13, 2007, and titled "Apparatus for Gate Valve Movement in a Minimum-Space Wet Process Environment". This application is incorporated herein by reference in their entireties for all purposes.

BACKGROUND

1. Field of the Invention

The present invention relates generally to apparatus for processing wafers, and more particularly to apparatus for gate valve movement in a wet process environment in which a configuration of a wall of a wet processing chamber reduces space available for moving the gate valve to permit wafer transfer to and from the wet process environment.

2. Description of the Related Art

In the semiconductor chip fabrication industry, it is necessary to transfer a wafer (e.g., a semiconductor substrate) into and out of a chamber to facilitate wafer processing operations. For example, for vacuum operations at low process pressures, a chamber may be configured with a flat wall around an opening through which the wafer is transferred into and out of the chamber. In many situations, the flat wall may enable adequate space to be available for gate movement to open and close the opening without interference with wafer transfer equipment.

However, wet processes performed in process chambers may require chamber wall configurations other than the flat configuration, and these wall configurations may present problems in gate movement and wafer transfer. In one wet process example, for reasons of safety and management of wet process materials that may cause contamination outside the chamber, it is necessary to receive and drain (i.e., collect) fluids. The fluids may drip from or flow off a gate as a wafer exits the opening from a wet process chamber. In this example, problems are presented when apparatus for such collecting must be adjacent to an access opening in an otherwise flat wall of a wet process chamber. The collecting apparatus reduces an amount of space otherwise available for gate movement, and there is a problem in satisfying the fluid collecting requirement and at the same time effecting gate movement in the available space without interfering with wafer transfer equipment.

In view of the foregoing, there is a need for improved gate movement in a wet process environment, in which the fluid collecting may still occur adjacent to the opening in a wall of a process chamber while moving the gate relative to the opening to avoid interference with equipment for wafer transfer through the opening.

SUMMARY

Broadly speaking, embodiments of the present invention (herein referred to as the "embodiments" or "embodiment") fill the above needs by providing improved gate movement in a wet process environment, in which fluid collecting occurs adjacent to an access opening in a wall of a process chamber while a gate is moved relative to the opening without interference with equipment that transfers the wafer through the access opening. Such needs are filled even though apparatus for such fluid collecting must be adjacent to the access opening, and even though the collecting apparatus reduces an amount of space otherwise available for gate movement. It should be appreciated that the present invention can be implemented in numerous ways, including as a method, a process, an apparatus, or a system. Several inventive embodiments are described below.

In one embodiment, a gate valve is provided for allowing a workpiece transfer unit to access a wet process chamber. The gate valve may include a wall configured with an opening through which the unit has access to the chamber. The wall may be configured with an offset extending in an access direction toward the transfer unit. The offset defines a fluid collection groove, and the groove may include a lip that reduces a value of a space between the wall and the unit, so that there is a reduced space in the access direction in which workpiece transfer may occur. A first drive may be configured with a distal end. The drive is mounted on the offset in the reduced space and extends in the access direction less than the reduced space to orient the distal end separated from the transfer unit in the access direction. The drive may also be configured to guide and move the distal end in the reduced space parallel to the wall, the moving being between a first position and a second position. An adapter may be mounted on the distal end separated from the transfer unit and extending in the access direction toward the wall. The adapter may be configured with a frame defining a window. The window may be opposite to the opening when the distal end is in the second position and may be below the opening when the distal end is in the first position. Transfer unit access to the wet process chamber is allowed with the distal end in the first position. A second drive may be mounted in the frame, and may be configured with a bladder shaped to extend in the access direction away from the transfer unit and through the window and over the groove. The second drive may be further configured with a gate mounted on the bladder, the gate being configured so that with the window below the opening the gate extends into the groove to allow the transfer unit access to the wet process chamber. The gate may be further configured so that, with the window opposite to the opening, the gate is aligned with the opening in the access direction. The second drive may be further configured to move the aligned gate away from the transfer unit and over the groove into contact with the wall to close the opening.

In another embodiment, apparatus is provided for moving a gate to allow a wafer transfer unit to access a wet process chamber along an access path extending from a first location. The apparatus may include a wet process chamber wall configured with a slot and an access surface. The slot may have a depth extending in a direction of the access path to the access surface. The slot may have a height transverse to the access path direction, and the access surface may be located at a first distance from the first location. The access surface may have an opening through which the access path extends. The slot height may extend transversely of the opening, and the slot depth may be defined by a fluid collection lip located at a second distance from the first location. The second distance is less than the first distance. A first drive may be mounted on the lip and configured with a drive depth extending in the access path direction less than the second distance so that the first drive is spaced from the transfer unit. The first drive may have a distal end located within the drive depth. The first drive may also be configured to guide and move the distal end between a first position and a second position. An adapter may be mounted on the distal end spaced from the transfer unit and extending in the access path direction toward the access surface. The adapter may be configured with a frame defining a window, the window being opposite to the opening when the distal end is in the second position and being below the opening when the distal end is in the first position. The window below the opening is out of the access path for transfer unit access to the wet process chamber. A second drive may be mounted in the frame spaced from the transfer unit. The second drive may be configured with a bladder extending in the access path direction away from the transfer unit and through the window and beyond the lip toward the access surface. The second drive may be configured to mount the gate on the bladder so that with the window lower than the opening the gate extends in the slot depth and out of the access path. The configuration of the second drive may be such that with the window opposite to the opening the gate is in the slot depth aligned in the access path direction with the opening. The bladder may be configured to position the aligned gate relative to the transfer unit and in the slot depth to close and open the opening. A sensor unit may be mounted on the frame spaced from the transfer unit and configured for response to the position of the aligned gate for controlling operation of the first drive.

In yet another embodiment, a second drive may be mounted in a frame. The second drive is configured with a bladder extendable in the access path direction away from a transfer unit and from the frame and beyond a lip toward an access surface. The extendable bladder is configured as a hollow member with an invaginated shape supporting a coupling. The invaginated shape is characterized by requiring internal fluid pressure to effect the extension in the access path direction toward the access surface to move the aligned gate away from the transfer unit and in the slot depth into contact with the access surface to close the opening. The extension reconfigures the invaginated shape into a sloped shape that extends toward the access surface more than the invaginated shape. The hollow member with the invaginated shape is further characterized by a tendency upon relief of the internal fluid pressure for the sloped shape to return to the invaginated shape and move the aligned gate in the slot depth out of contact with the access surface.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Several exemplary embodiments are disclosed, which define examples of a gate valve for allowing a workpiece transfer unit to access a wet process chamber, wherein an exemplary workpiece is a wafer. In the embodiments, improved gate movement is thus provided in a wet process environment. Fluid collection from the gate occurs during wafer transfer adjacent to an access opening in a wall of the process chamber, and the gate is moved relative to the opening without interference with the unit that transfers the wafer through the access opening. Thus, even though apparatus for such fluid collection must be adjacent to the access opening, and even though the collecting apparatus reduces an amount of space otherwise available for gate movement, the gate movement is without such interference.

Several inventive embodiments are described below. It will be apparent to those skilled in the art that the present invention may be practiced without some or all of the specific details set forth herein.

The word "wafer," as used herein, denotes without limitation, semiconductor substrates, hard drive disks, optical discs, glass substrates, flat panel display surfaces, liquid crystal display surfaces, etc., on which materials or layers of various materials may be formed or defined in a processing chamber, such as a chamber in which a plasma is established for processing, e.g., etching or deposition. All such wafers may be processed by the embodiments in which the improved gate movement is provided in a minimum-space wet process environment.

Orientation of the wafer (and of structures) is described herein in terms of orthogonal X, Y and Z axes. Such axes may define directions, such as directions of surfaces or of movements or of planes, etc.

Figure 1:
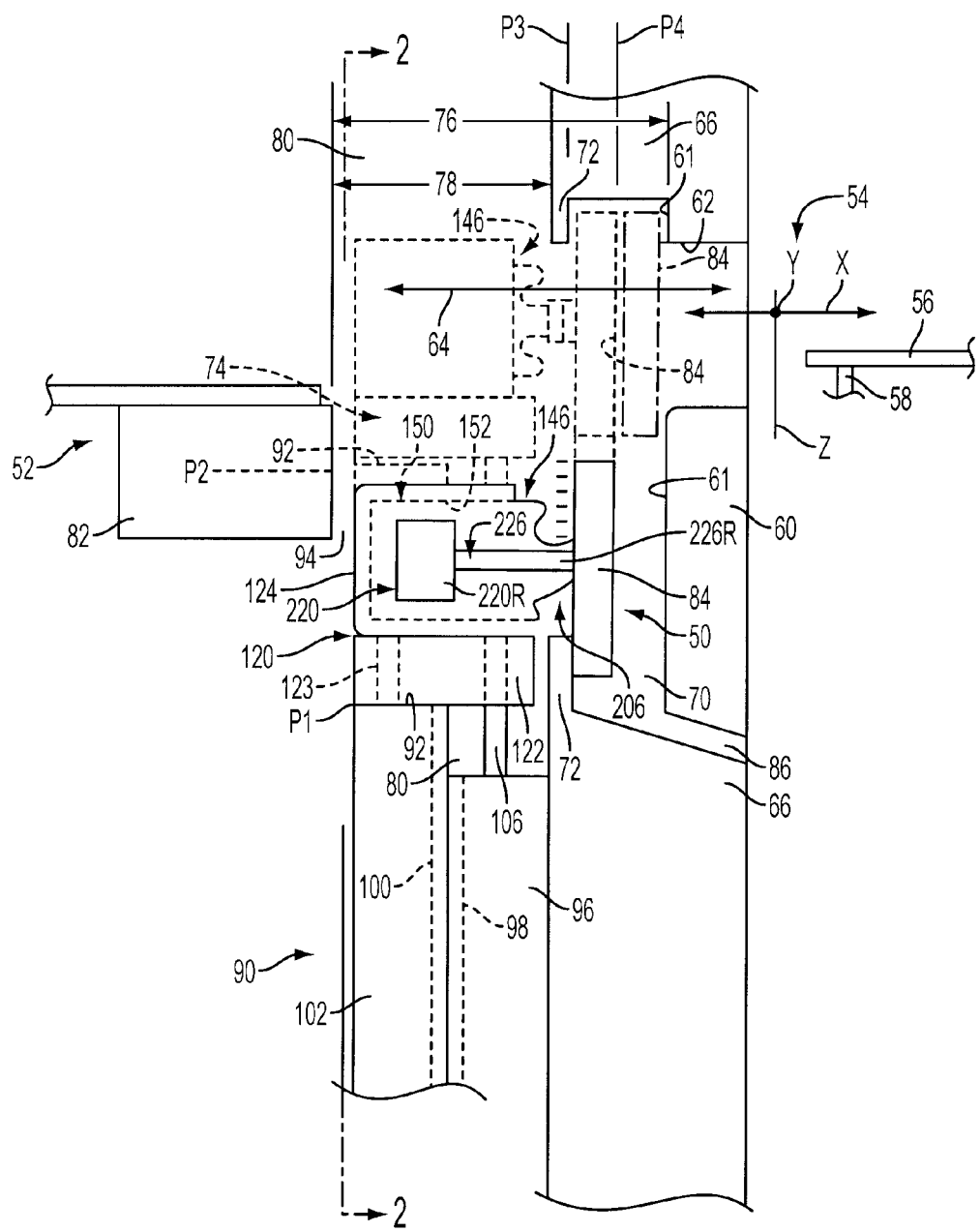
FIG. 1 is a side view of one embodiment of a gate valve configured to provide improved gate movement relative to a wet process chamber and in a minimum-space environment for wafer transfer relative to the chamber according to the present invention.

With the above definitions in mind, reference is now made to exemplary structure configurations for filling these and other needs, which will improve gate movement in the minimum-space wet process environment. FIG. 1 illustrates a gate valve 50 for allowing a workpiece, or wafer, transfer unit 52 to access a wet process chamber 54. An exemplary workpiece in the form of a wafer 56 is shown in the wet process chamber supported on pins 58 after a wafer transfer operation of the unit. In one embodiment the gate valve 50 includes a wall 60 configured with an access surface 61. For example, the wall 60 may define an extent of the chamber 54. An opening 62 extends through the surface 61 and the wall 60. The unit 52 has access to the chamber 54 through the opening 62, e.g., for the wafer transfer along an access path 64. The wall 60 is configured with an offset 66 extending in an access direction that is parallel to the X axis and to the access path 64. The offset 66 extends toward the transfer unit 52, and defines a slot, or fluid collection groove, 70. The slot 70 includes a lip, or fluid collection lip, 72 that is spaced from the access surface 61 and that extends in the access direction from the wall 60. The slot 70 is configured with an X axis depth extending in the direction of the access path 64 to the access surface 61, the depth being a distance between the lip 72 and the access surface 61. The slot 70 is also configured with a slot height shown extending transversely of the opening 62, i.e., in the direction of the Z axis and transversely to the access path direction, and extending lower than the opening 62. In one embodiment, the slot height is about 2.5 inches, the slot width is about 13 inches, and the slot depth is about 1 inch, for example.

The offset 66 and lip 72 (in the access direction relative to the access surface 61) reduce a value of a space 74 between the access surface 61 of the wall 60 and the unit 52. Whereas the space 74 is shown having a dimension 76 between the access surface 61 of the wall 60 and the unit 52, the offset 66 and lip 72 reduce the dimension 76 to a dimension 78 to define a reduced space 80 in the access direction. Dimension 78 is thus shown having a value less than the value of the dimension 76. In other words, the access surface 61 may be located at a first distance from a first location (at which the unit 52 is located) and that first distance corresponds to dimension 76. The slot depth may also be defined by (or in terms of) the fluid collection lip 72 located at a second distance from the first location, wherein the second distance corresponds to dimension 78. Thus, the second distance is less than the first distance.

Because the unit 52 includes a rotary support, or wrist, 82 that rotates on an axis that is fixed in the access (or X) direction, and because the offset 66 and lip 72 are also fixed in the access (or X) direction, the offset 66 and lip 72 reduce the amount of room available in the X direction for actuation of a gate 84 of the gate valve 50. In other words, as compared to the space 74 (that is between the access surface 61 of the wall 60 and the unit 52), the reduced space 80 between the lip 72 and the unit 52 provides less available room in the X direction for actuation of the gate 84 of the gate valve 50. In one embodiment, dimension 76 is about 1.25 inches and dimension 78 is about 0.6 inches, such that the facilities of the embodiments for gate movement must be received in less than the 0.6 inches of dimension 78, thus the small dimension 78 is exemplary of the minimum-space environment. Still referring to FIG. 1, the fluid collection groove, or slot, 70 is shown configured with drain 86 to return to the chamber 54 fluid collected from the gate 84 or from wafers 56 exiting the chamber.

Figure 2:
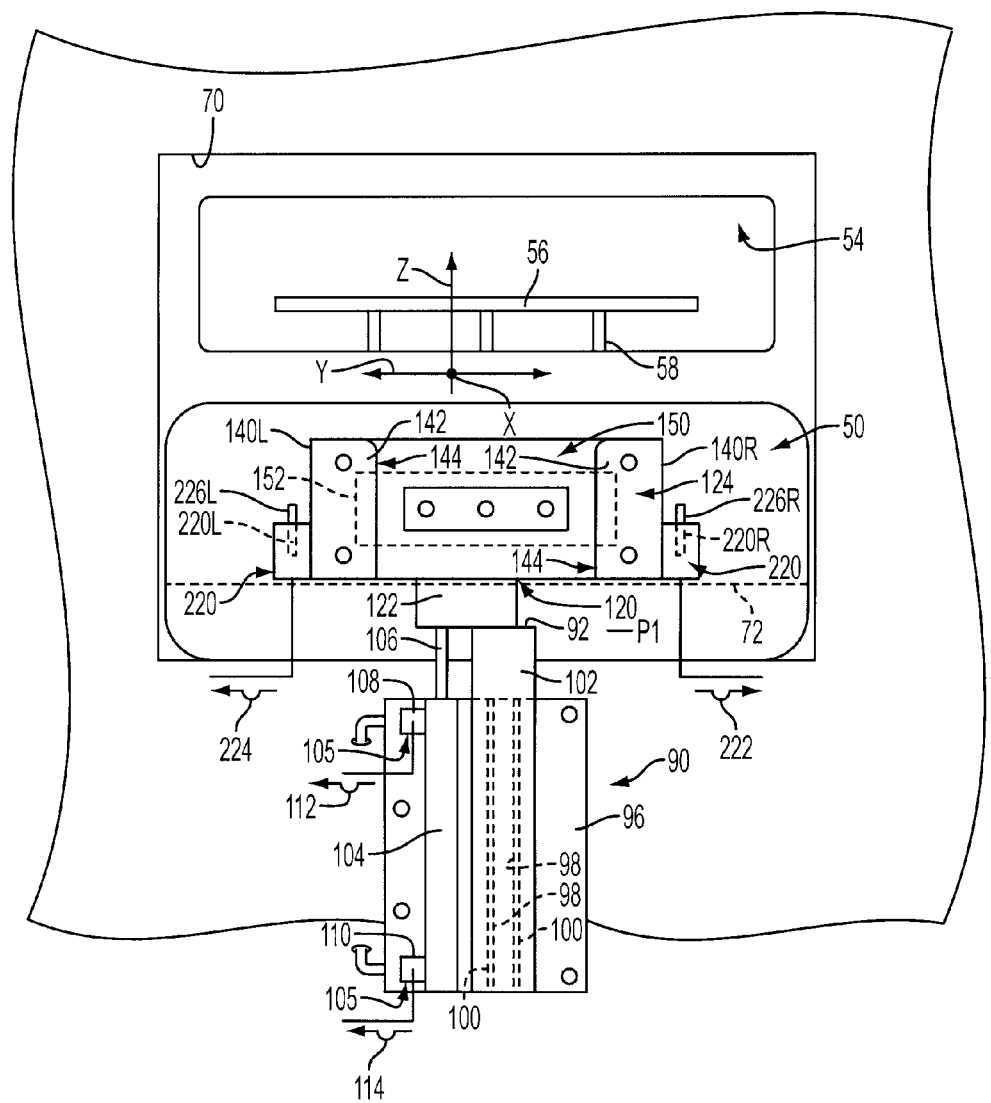
FIG. 2 is a view taken along line 2-2 of FIG. 1, illustrating two drives in the minimum-space environment for moving a gate relative to an opening in a wall of the wet process chamber without interference with a wafer transfer unit.

Referring to FIGS. 1 and 2, there is shown a first drive 90 configured with a distal end 92. The drive 90 is mounted on the offset 66 (as by being secured by bolts) and is in the reduced space 78. The drive 90 extends in the access (or X) direction (of the access path 64), and that extension is less than the value of the reduced space 78. The mounted drive 90 with such extension orients the distal end 92 separated from the transfer unit 52 in the access (or X) direction. A space 94 (FIG. 1) identifies such separation. A drive depth extends in the access path (X axis) direction less than the second distance so that the first drive 90 is spaced from the transfer unit 52. The drive 90 is further configured to guide and move the distal end 92 in the reduced space 78. The guiding and moving is parallel to the Z axis direction of the wall 60 and is between a first position P1 of the end 92 (see solid lines) and a second position P2 of the distal end 92 (see dashed lines in FIG. 1).

In more detail, the first drive 90 is shown configured with a mounting plate 96 that secures the first drive 90 to the wall 60 via the offset 66 (i.e., adjacent to the lip 72). The plate 96 is configured with a guide track 98 that extends in the Z direction (see dashed lines) and cooperates with track riders 100 (see dashed lines) that also extend in the Z direction. The riders 100 are on a slide 102 that is guided in the Z direction to move the distal end 92 of the slide 102 between the positions P1 and P2. The mounting plate 96 also supports a drive cylinder 104 and a piston that move a piston rod 106 in the Z direction. To indicate the position of the piston, and thus the position of the distal end 92, a sensor unit 105 may include the piston configured from a magnetic material, or having a magnet in it. The piston of the sensor unit 105 cooperates with spaced sensors 108 and 110 of the unit 105. Sensors 108 & 110 are sensitive to a magnetic field from the piston. When a respective one of the sensors 108 and 110 senses the field, that sensor outputs a respective signal 112 or 114. Signal 112 indicates that first drive 90 drive has moved the end 92 UP to position P2, and signal 114 indicates movement DOWN to position P1. In a general sense, the UP position P2 corresponds to the gate 84 aligned with the access path 64 and with the opening 62 in preparation for closing the opening (see dash-dot lines in FIG. 1) or opening the closed opening (see dash-dash lines in FIG. 1). The DOWN position P1 corresponds to the gate 84 below and clearing the access path 64 so that the access path is unobstructed (i.e., clear) and the opening 62 is ready to receive a wafer 56 from the unit 52 or to permit access to the chamber 54 by the unit 52 to remove a wet wafer 56.

Figure 3:
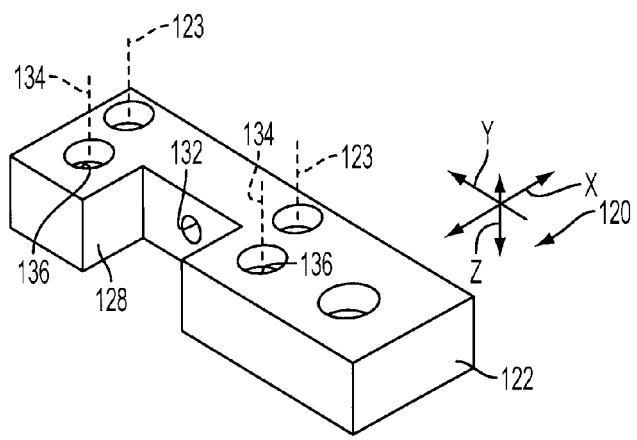
FIG. 3 is a perspective view of an end block of an adapter configured to connect one of the drives to the other of the drives.

Still referring to FIGS. 1 and 2, and also to FIG. 3, to facilitate the movement of the gate 84 for the above-described closing and opening of the opening 62, an adapter 120 is mounted on the distal end 92 separated from the transfer unit 52 and extending in the access (or X) direction toward the wall 60 and the access surface 61. To also provide the space 94 between the adapter 120 and the unit 52 when the adapter 120 is moved by the distal end 92 into the UP position 2, the adapter 120 is configured with an end block 122 stacked on and tightly secured to the distal end 92 (as by bolts 123, shown in dashed lines in FIGS. 1 & 3). In this manner, forces parallel to the access path 64 (in the X direction) are transferred to and through the end block and to and resisted by the slide 102 and the guide track 98. FIG. 1 shows the end block 122 extending in the X direction from the distal end 92 into a position overlying the mount plate 96. FIGS. 1 and 2 show the end block 122 extending in the X and Y directions from the distal end 92 into a position overlying the piston rod 106. Rod 106 is secured to the end block 122 to drive the end block 122 for both UP and DOWN movement in the Z direction.

Figure 4:
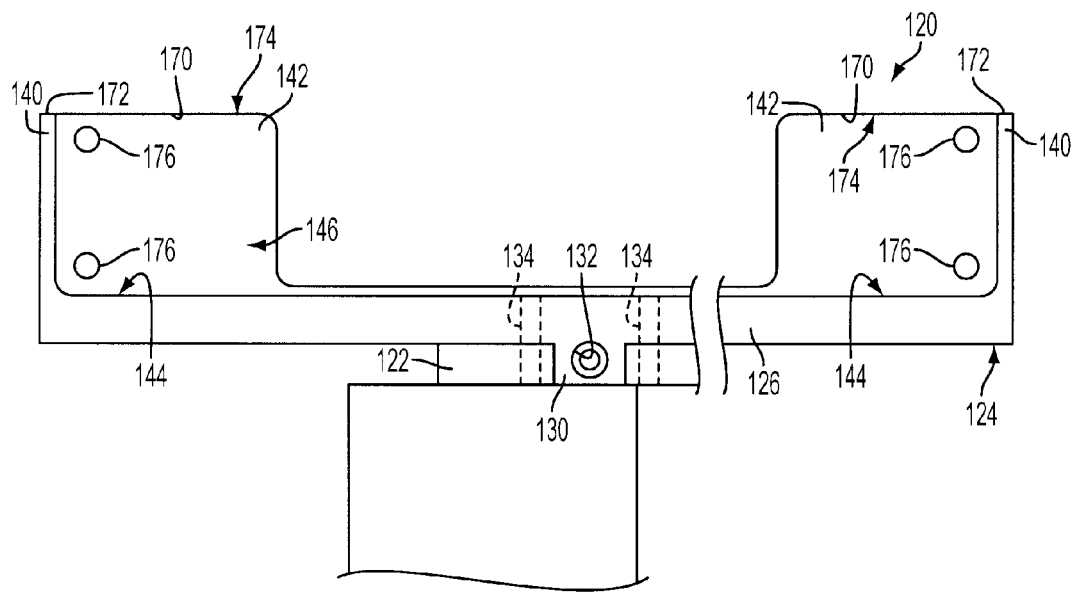
FIG. 4 is an elevational view of a frame configured to be mounted on the end block, illustrating a window through which the other drive extends for moving the gate.

Still referring to FIGS. 1 and 2, and also to FIGS. 3 and 4, the adapter 120 is also configured with a frame 124 tightly mounted to the end block 122. FIG. 4 shows the frame configuration for the tight mounting including a base 126 overlying a cutout 128 (FIG. 3) of the end block 122. A tab block 130 extends from the base 126 into the cutout 128 and is bolted horizontally into threaded hole 132. Also, the frame 124 is secured to the end block 122 by bolts 134 extending down through the base 126 into threaded holes 136 on opposite sides of the cutout 128 to mount the frame 124 against rotation. FIG. 4 shows the frame 124 configured with opposite sides 140 and back portions 142 configured to resist forces in the X direction. With the base 126, the sides 140 and the back portions 142, the frame defines an enclosure 144 that is partially closed at the rear (FIG. 2), fully closed at the sides 140 and that defines a window 146 (FIG. 1) that is completely open at the front as viewed in FIG. 4. In FIG. 1 in dashed lines the window 146 is shown opposite to the opening 62 when the distal end 92 is in the second (UP) position P2. In solid lines the window 146 is shown lower than the opening 62 when the distal end is in the first (DOWN) position P1. In position P1 the transfer unit 52 is allowed access to the wet process chamber 54 because the access path 64 is clear as described above.

FIGS. 1 and 2 show a second drive 150 mounted in the frame 124 and separated from the wafer transfer unit 52. The second drive 150 is configured with a bladder 152 (FIGS. 1, 5A & 5B) configured to extend in the access direction parallel to the access path 64. In a general sense, this configuration extends the bladder 152 away from the transfer unit 52 and through the window 146 and over the fluid collection groove 70. Such extension is beyond the lip 72 toward the access surface 61. Also, the second drive 150 is configured to mount the gate 84 on the bladder 152 so that with the window 146 lower than the opening 62, the gate extends in the slot depth and out of the access path 64. The configuration of the second drive 150 is also such that with the window 146 opposite to the opening 62, the gate is in the slot depth aligned in the access path direction with the opening 62. The bladder is configured to position the aligned gate relative to the transfer unit 52 and in the slot depth to close and open the opening.

Figure 5A:
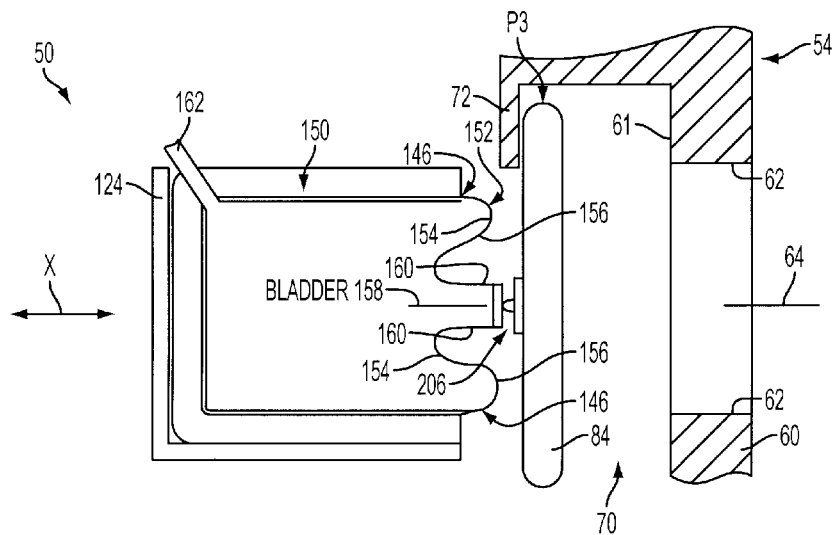
FIG. 5A is an enlarged side view of the other drive mounted in the frame, illustrating a bladder of the drive retracted to position the gate in an open position.
Figure 5B:
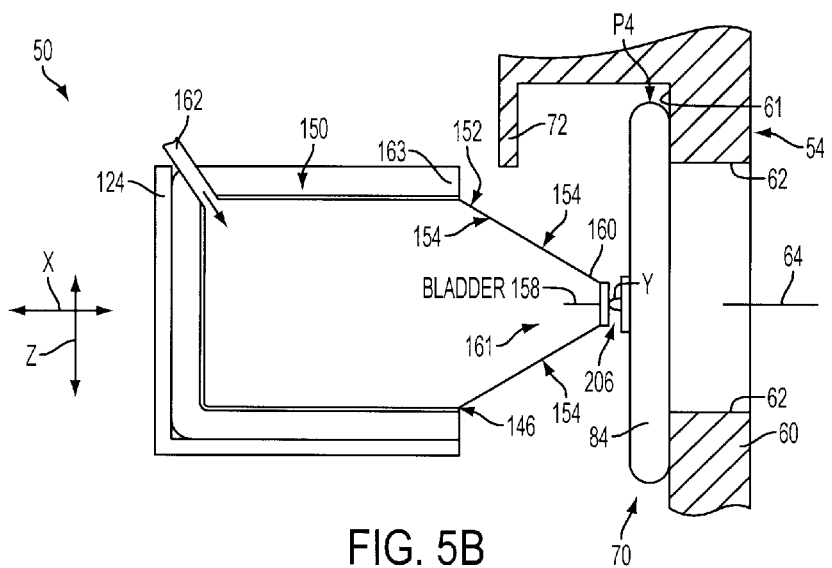
FIG. 5B is an enlarged side view of the drive shown in FIG. 5A, illustrating the bladder extended to move the gate into a closed position.

FIGS. 5A and 5B show such configuration and extension of the bladder 152 as the bladder 152 moves the gate 84 from a gate OPEN position P3 (FIG. 5A) to a gate CLOSED position P4 (FIG. 5B). In the gate OPEN position P3 the gate 84 is spaced from the access surface 61. In the gate CLOSED position P4 the gate 84 is pressed against the access surface 61 and closes the opening 62. For this movement, the second drive 150 may be described as being configured with the gate 84 mounted on the bladder 152. FIG. 1 shows that the gate 84 is configured so that, with the window 146 lower than the opening 62, the gate 84 extends into the groove 70 to allow the transfer unit 52 to have access to the wet process chamber 54 along the access path 64. The gate 84 is further configured so that, with the window 146 opposite to the opening 62 (FIG. 5B), the gate is aligned with the opening 62 in the access direction parallel to the access path 64.

As described with respect to FIGS. 5A & 5B, the second drive 150 is configured to move the aligned gate 84 away from the transfer unit 52 and over the groove 70 into contact with the wall 60 (and with the access surface 61 of the wall 60) to close the opening 62. In more detail, the configuration of the bladder 152 is hollow, and is elongated in the Y direction to extend partially across each back portion 142 as shown in dashed lines in FIG. 2. In the side elevational view of FIG. 5A, opposed outside walls 154 of the bladder are shown in the gate OPEN position. Each outside wall 154 is configured to extend from the frame 124 toward the opening 62 and is configured with a curved, or folded, section, 156 that is folded back on itself toward an axis 158 of the bladder 152. Section 156 then curves again, extending closer to the axis 158, and extends in the X axis direction toward the opening 62 to a central drive end 160. This folded back configuration of section 156 is thus an invaginated shape with the bladder 152 in the gate OPEN position. FIG. 5B shows that under the force of pressurized fluid admitted into the bladder 152 though a port 162 (see arrow in the port in FIG. 5B) the folded section 156 of the outside wall 154 unfolds, extends toward the opening 62, and assumes a generally sloped shape 161. The sloped shape 161 extends from a drive housing 163 (that contains the bladder 152) to the drive end 160, resulting in movement of the gate 84 from FIG. 5A position P3 (gate OPEN) to FIG. 5B position P4 (gate CLOSED).

In review, the second drive 150 is mounted in the frame 124 and is configured with the bladder 152 that is extendable in the X axis (access path) direction away from the transfer unit 52 and from the frame 124 and beyond the lip 72 toward the access surface 61. The second drive configured with the extendable bladder 152 is configured as a hollow member (with the walls 154) and with the invaginated shape of section 156. The invaginated shape of section 156 is characterized by requiring internal fluid pressure by the pressurized fluid admitted through the port 162 to effect the extension in the access path 64. This extension is in the X axis direction toward the access surface 61, and moves the aligned gate 84 away from the transfer unit 52 while the gate is in the slot 70. The gate is thus in the slot depth and moves into contact with the access surface 61 to close the opening 62. The extension of the bladder 152 is shown in FIG. 5B reconfiguring the invaginated shape of section 156 into the sloped shape 161 that extends toward the access surface 61 more than the invaginated shape of section 156. The increased extension is the slot depth less the thickness in the X direction of the gate. The hollow member of the bladder 152 with the invaginated shape of section 156 and with the sloped shape 161 is further characterized by a tendency that occurs upon relief of the internal pressure in the bladder (i.e., by venting the port 162 to atmosphere). That tendency is for the sloped shape 161 to return to the invaginated shape of section 156 and move the aligned gate 84 in the slot depth out of contact with the access surface 61.

Figure 6:
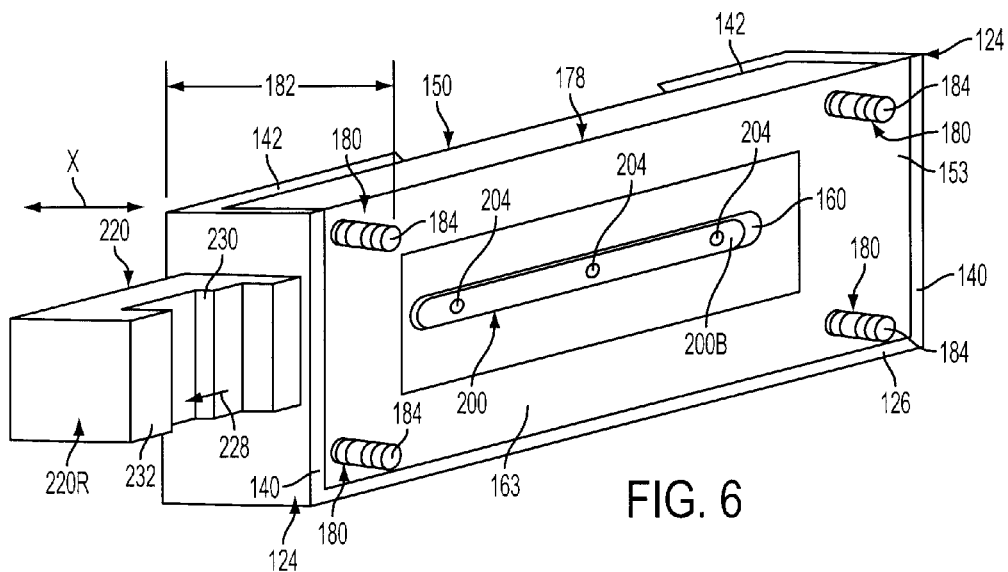
FIG. 6 is a perspective view of the other drive, illustrating the bladder configured with a coupling for connection to the gate and with standoff assemblies for orienting the gate.
Figure 7A:
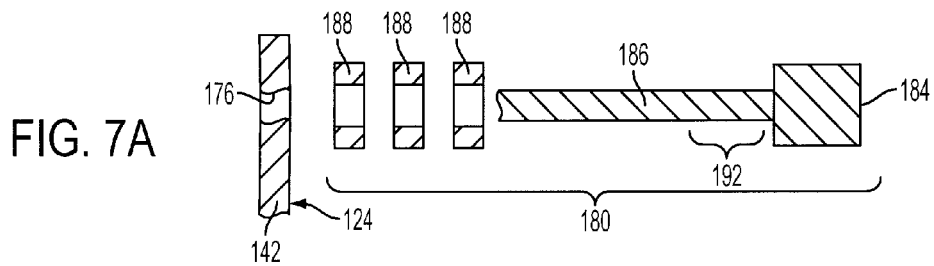
FIG. 7A is an exploded view of one of the standoff assemblies.
Figure 7B:
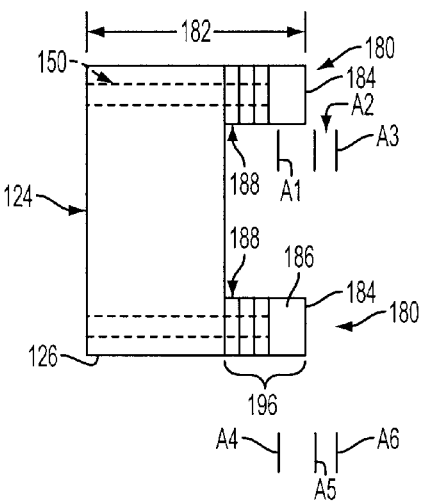
FIG. 7B is an end view of two of the standoff assemblies mounting the other drive to the frame, illustrating a variable distance of the standoff assemblies for orienting the gate.

Having described the movement of the drive end 160, the mounting of the second drive 150 to the frame 124 may be understood by reference again to FIG. 4, and to FIGS. 6, 7A and 7B. FIG. 4 shows the frame 124 before assembly with the housing 163 of the second drive 150. The back portions 142 are adjacent to the sides 140. An upper surface 170 of each back portion 142 and an upper surface 172 of each side 140, along with the base 126 of the frame define a perimeter 174 of the frame 124 having a rectangular shape. FIG. 4 also shows each back portion 142 configured with a pair of apertures 176 adjacent to the respective side 140, the apertures 176 being threaded.

Referring to FIG. 6, the housing 163 of the second drive 150 is also shown configured with a perimeter 178 that is complimentary with the frame perimeter 174 so that the housing 163 of the second drive 150 is snugly received in the frame 124. FIG. 6 also shows an array, or standoff array, of standoff assemblies, or standoffs, 180. In the exemplary array, one standoff assembly 180 is shown at each of the four corners of the rectangular complimentary perimeters 174 and 178, such that the assemblies 180 are spaced along the complimentary respective perimeters 174 & 178 of the frame 124 and second drive 150. Other arrays may be configured so as to both secure the second drive 150 to the frame 124 and to properly orient the gate 84 relative to the drive end 160 (FIG. 5B). In the proper orientation, when the gate 84 is pressed against the access surface 61 the opening 62 will be tightly closed. In a general sense, FIG. 6 shows a dimension 182 of a representative one of the assemblies 180, measured from the back portion 142 in the access path (or X) direction to an adjustable end 184 of the assembly 180. By the configuration of such assembly 180, the value of the dimension 182 may be varied to provide the proper orientation of the gate 84 as referred to above. Thus, adjustment of each of the standoffs 180 of the standoff array selects the dimension 182 as a respective space (e.g., at the location of the standoff 180) so that the standoffs 180 collectively hold the gate 84 rotated relative to the bladder 152 into the orientation in which the gate seats uniformly on the access surface 61, and the uniform seating is in such proper orientation FIG. 7A shows the configuration of one standoff assembly 180, and the following description is applicable to each assembly 180 with respect to a respective threaded aperture 176 (see also FIG. 4) of the frame 124. FIG. 7B shows the exemplary one assembly 180 configured for varying the dimension 182 while tightly mounting the second drive 150 to the frame 124. The standoff assembly 180 may comprise a fastener, or standoff, member 186 and standoff adjusters 188. The member 186 may be a bolt that screws into the threaded aperture 176 in the back portion 142 of the frame 124. As defined by the array, the assemblies 180 are spaced around the complimentary perimeters 174 and 178 of the respective frame 124 and second drive 150. The member 186 is shown in FIG. 7A configured with a first portion (bracket 192). In assembly, portion 192 is extended through apertures 190 of the standoff adjusters 188. Member 186 is extended through the frame housing 163 and threaded into the aperture 176. Tightening of the member 186 urges the standoff adjusters 188 against the housing 163 of the second drive 150 and holds the second drive against the back portions 142 so the drive 150 is tightly mounted on the frame 124. The standoff adjusters 188 are configured to adjust a standoff distance (bracket 196, FIG. 7B) by which the end 184 of the distal member 186 is spaced from the second drive 150. In another sense, each assembly 180 of the array is configured to extend along that standoff distance 196 from the second drive 150 into contact with the gate 84. Thus, one or more adjusters 188 may be placed over the member 186, and then the member 186 is inserted through the housing 163 of the drive 150 near the perimeter and tightened in aperture 176. Distance 196 is shown in FIG. 7B as extending between the housing 163 of the drive 150 and the adjusted end 184. In FIG. 7B a series of adjusted positions A1, A2, and A3 is shown, representing various exemplary amounts by which end 184 of one assembly 180 may be adjusted to vary the value of the dimension 182, and the positions A1-A3 correspond to use of an appropriate number of adjusters. Another series of adjusted positions A4, A5, and A6 is shown, representing various exemplary amounts by which end 184 of another assembly 180 may be adjusted to vary the value of the dimension 182 of that assembly, and the positions A4-A6 correspond to use of an appropriate number of respective adjusters. As adjusted, the end 184 enables the standoff member 186 to contact the gate 84 that is mounted on the bladder 152 in the manner described below. The assemblies 180 of the array cooperate to orient the gate 84 with respect to the bladder 152 according to the respective adjusted standoff distances 196. By selecting the adjusters 188, the standoff distances 196 are configured so that the gate 84 is oriented parallel to the wall 60, and thus to the access surface 61. Such parallelism provides the above-described proper orientation, such that when the gate 84 is pressed by the pressurized bladder 152 against the access surface 61, the opening 62 will be tightly closed. In this regard, it may be understood that a seal, such as an O-ring (not shown), may be provided on the side of the gate 84 that faces the access surface 61 to assist in tightly closing the opening. In review, the adjustment of each of the standoffs of the standoff array selects the respective space so that the standoffs 180 collectively hold the gate 84 rotated relative to the bladder 152 into the orientation in which the gate seats uniformly on the access surface 61.

Figure 8:
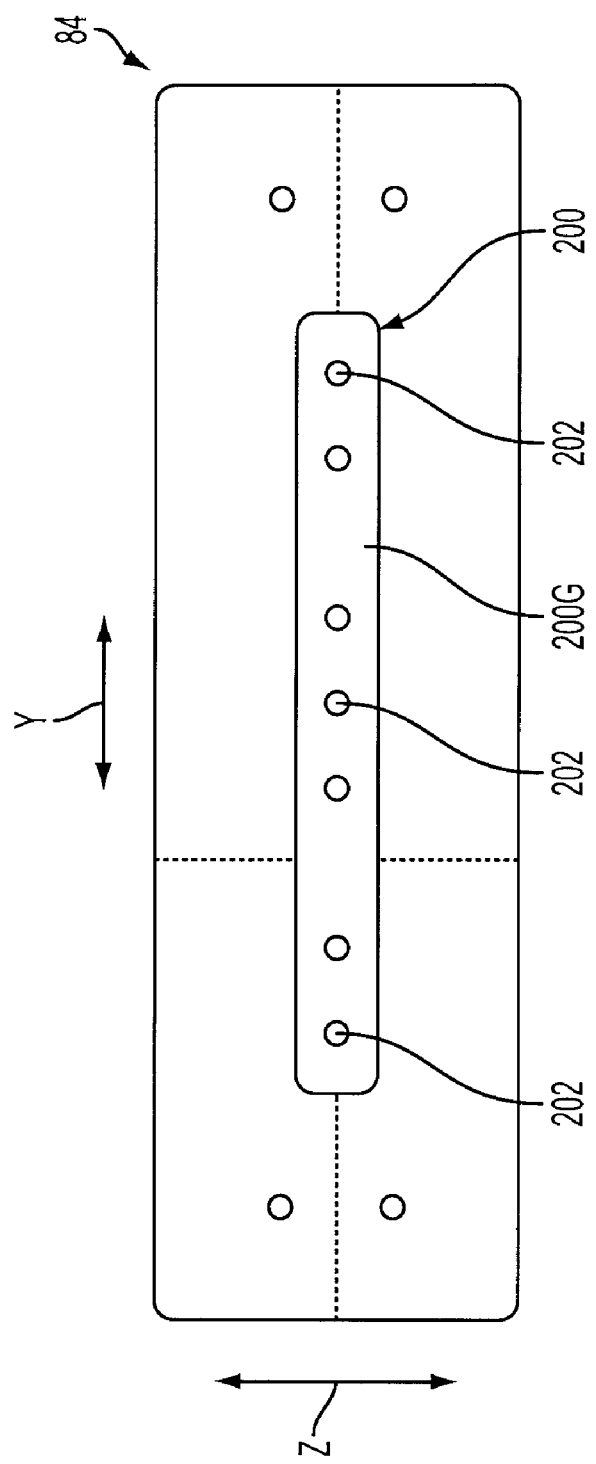
FIG. 8 is a front view of the gate, showing a gate portion of the coupling.

With the described mounting of the second drive 150 to the frame 124, and the described adjusters 188, the mounting of the drive end 160 of the bladder 152 to the gate may be understood by reference again to FIG. 6, and to FIG. 8. In FIG. 6, the configuration of the second drive 150 is shown to mount the gate 84 on the bladder 152. The bladder 152 is configured for this mounting by a coupler, or central coupling, 200 secured to (and joining each) each of the gate 84 and the bladder 152. One coupler 200 is identified as 200B and is mounted on the drive end 160 of the bladder 152. Coupler 200B is configured to receive and releasably retain snap members 202 of the other coupler (identified as 200G, FIG. 8) while allowing the gate 84 to move relative to the bladder 152. The movement may be the rotation described below. The coupling 200 is shown in FIGS. 6 and 8 positioned centrally, in that in the Z direction FIG. 6 shows the coupler 200B about midway between the top and bottom of the bladder 152 (that is elongated in the Y direction). Further, in the Z direction FIG. 8 shows the coupler 200G about midway between the top and bottom of the gate 84 (that is also elongated in the Y direction). The central coupling 200 is shown in FIG. 6 further comprising the coupler 200B configured with a series of receptors 204 extending centrally in the Y direction. The central coupling 200 is shown in FIG. 8 further comprising the coupler 200G configured with a series of the snap members 202 extending centrally in the Y direction. The receptors 204 and snap members 202 may be reversed, e.g., with the snap members on the coupler 200B and the receptors 204 on the coupler 200G. Thus, the coupler 200 may be described as a series of the receptors 204 extending along one of the bladder 152 and the gate 84, and a series of projections (of the snap members 202) extending centrally along the other of the bladder 152 and the gate 84. A receptor 204 and a projection (snap member 202) of the series are opposed and define a coupling pair 206 (FIG. 5B). Each coupling pair 206 is configured to join (by a snap fit) to allow the rotation. The rotation may be understood by reference again to FIG. 5B in which the Y axis is shown as a dot. It may be understood that the coupling pair 206 may act as a pivot in the manner in which the Y axis may act as a point of rotation (or pivot) around which the Z axis may rotate. Thus, the gate 84 may tilt, or rotate, on the pivot provided by the coupling pair 206.

In one embodiment, the standoffs 180 may be in an array including a first row of standoff assemblies 180 on one side of the central coupling 200 and a second row of standoff assemblies on another side of the central coupling 200. These rows may be understood by reference to FIG. 6 in which the two upper assemblies 180 define one row, and the two lower assemblies 180 define a lower row. Each of such standoff assemblies 180 may include the fastener 186 extending through the frame (e.g., through perimeter 174) and through the perimeter 178 of the housing 163 of the second drive to hold the second drive 150 to the frame 124. The fastener may include a standoff 180 configured with a gate rotation control surface (e.g., in the form of the end 184 of the standoff member 186). The standoff 180 is adjustable (by rotation into or out of the aperture 176) so that the gate rotation control surface (e.g., end 184) is positioned at a selectable space (e.g., 196) from the second drive 150 when the second drive is held tightly to the frame 124 by the standoff 186.

In review, the second drive 150 mounted in the frame 124 by the array of standoff assemblies 180 includes each assembly 180 of the array configured (as described above) to define the standoff distance 196 and extend from the second drive 150 into contact with the gate 84. The gate is mounted on the bladder 152, and the contact between the assemblies 180 and the gate 84 stops (e.g., prevents) the movement (e.g., rotation) of the gate 84 relative to the bladder 152. This movement is stopped with the gate oriented parallel to the wall 60. In more detail, the configuration of each standoff assembly 180 of the array to define the standoff distance 196 comprises the adjusters 188 configured as a plurality of spacers between the standoff member 186 and the drive 150, the member 186 and aperture 176 defining respective second and first mating fasteners. The referenced distance 196 is adjusted to adjust the amount by which the second fastener (member 186) is spaced from the second drive 150 when member 186 is tightly mated with the first fastener (aperture 176). The tight mating presses the spacers 188 one against the other and against the second drive 150. The spacers 188 of the respective standoff assemblies 180 of the array are selected (as described above) to orient the gate 84 parallel to the wall 60, and parallel to access surface 61. For example, the described rotation may be by lengthening the top two adjusters 188 or shortening the bottom two adjusters 188, in each case causing the gate 84 to rotate in an exemplary clockwise direction as viewed in FIG. 1. Thus, adjustment of each of the standoffs 180 of the standoff array selects the dimension 182 as a respective space (e.g., at the location of the standoff 180) so that the standoffs 180 collectively hold the gate 84 rotated relative to the bladder 152 into the orientation in which the gate seats uniformly on the access surface 61, and the uniform seating is in such proper orientation. Thus, although the central coupling 200 joining the gate 84 and the bladder 152 allows the described rotation of the gate 84 relative to the bladder 152, the assemblies 180 cooperate with the gate to hold the gate in the orientation in which the gate 84 seats uniformly on the access surface 61 to make a tight seal when the aligned gate 84 is positioned to close the opening 60.

With the above structure of the gate valve 50 in mind, FIG. 6 shows that in one embodiment a sensor unit 220 is mounted on the frame 124. FIG. 1 shows the unit 220 spaced from the transfer unit 52 (in the X direction). Generally, in response to the position of the aligned gate 84, (i.e., the gate 84 moving out of contact with the wall 60), the sensor unit 220 generates a control signal, e.g., 224, described below, to initiate operation of the first drive 90 to move the distal end 92 into the first position P1 and allow the transfer unit 52 access to the wet process chamber 54. Generally, sensor unit 220 is also configured to respond to the position of the aligned gate 84 (i.e., the gate 84 moving into contact with the access surface 61 of the wall 60) for initiating operation of the unit 52. In one embodiment shown in FIG. 2, sensor unit 220 may be provided as two sensors, referred to as sensor 220R and sensor 220L according to sensor location on the frame 124. As viewed in FIG. 2, the frame 124 is configured with the opposite sides 140, a right side viewed in FIG. 2 being side 140R, a left side viewed in FIG. 2 being side 140L. Sensor unit 220 comprising first sensor 220R is mounted on one (right) side 140R the frame and second sensor 220L is mounted on the other (left) side 140L of the frame 124. Generally, in one embodiment, the sensors 220R and 220L may be of opposite "polarity" (as described below). The opposite polarity is exemplified by a response to a gate CLOSED (or gate completely, or fully, IN) position of the gate 84 (i.e., closure of the opening 62, FIG. 5B). In the gate CLOSED position, the first (right) sensor 220R outputs a signal, or gate IN signal, 222 indicating the gate CLOSED position (i.e., the closure of the opening 62). The other (left) sensor 220L generates no signal when the gate CLOSED position occurs. The opposite polarity may also be exemplified by a response to a gate OPEN position (i.e., a complete, or full, opening of the opening 62), in which the first (right) sensor 220R outputs no signal 222 and second (left) sensor 220L outputs the signal, or gate OUT signal, 224 indicating the gate OPEN (or gate OUT) position (i.e., that the opening 62 is open). In a general sense, opposite polarities of the sensors 220 is with respect to whether a signal (222 or 224) is output when a flag 226 breaks or makes a sensor beam 228 (FIG. 9).

To facilitate the response of the sensors 220R and 220L to the position of the gate 84 (and response to the resulting gate OPEN or CLOSED positions), the sensor unit 220 is configured with flags 226. In detail, FIG. 1 shows that the gate 84 is configured with (mounts) one flag 226, and FIG. 2 shows one such flag 226 corresponding to each of the opposite sides 140. The opposite polarities of the sensors 220L and 220R are also with respect to the flags 226, and FIG. 2 shows that flag 226R cooperates with sensor 220R, and flag 226L operates with sensor 220L. Thus, the flags 226 mounted on the gate 84 move together (at the same time) with (or according to) the positioning of the gate 84. The flags 226R and 226L cooperate with the respective sensor 220R and 220L. Generally, the cooperation is that no signal (222 or 224) is output by either sensor 220 when the gate 84 is between the full open position (FIG. 5A) and the full closed position (FIG. 5B). The cooperation may also be that a signal is output by only one of the sensors 220 when the gate is in the full open position. The cooperation further may be that a signal is output by only the other of the sensors 220 when the gate 84 is in the full closed position.

Figure 9:
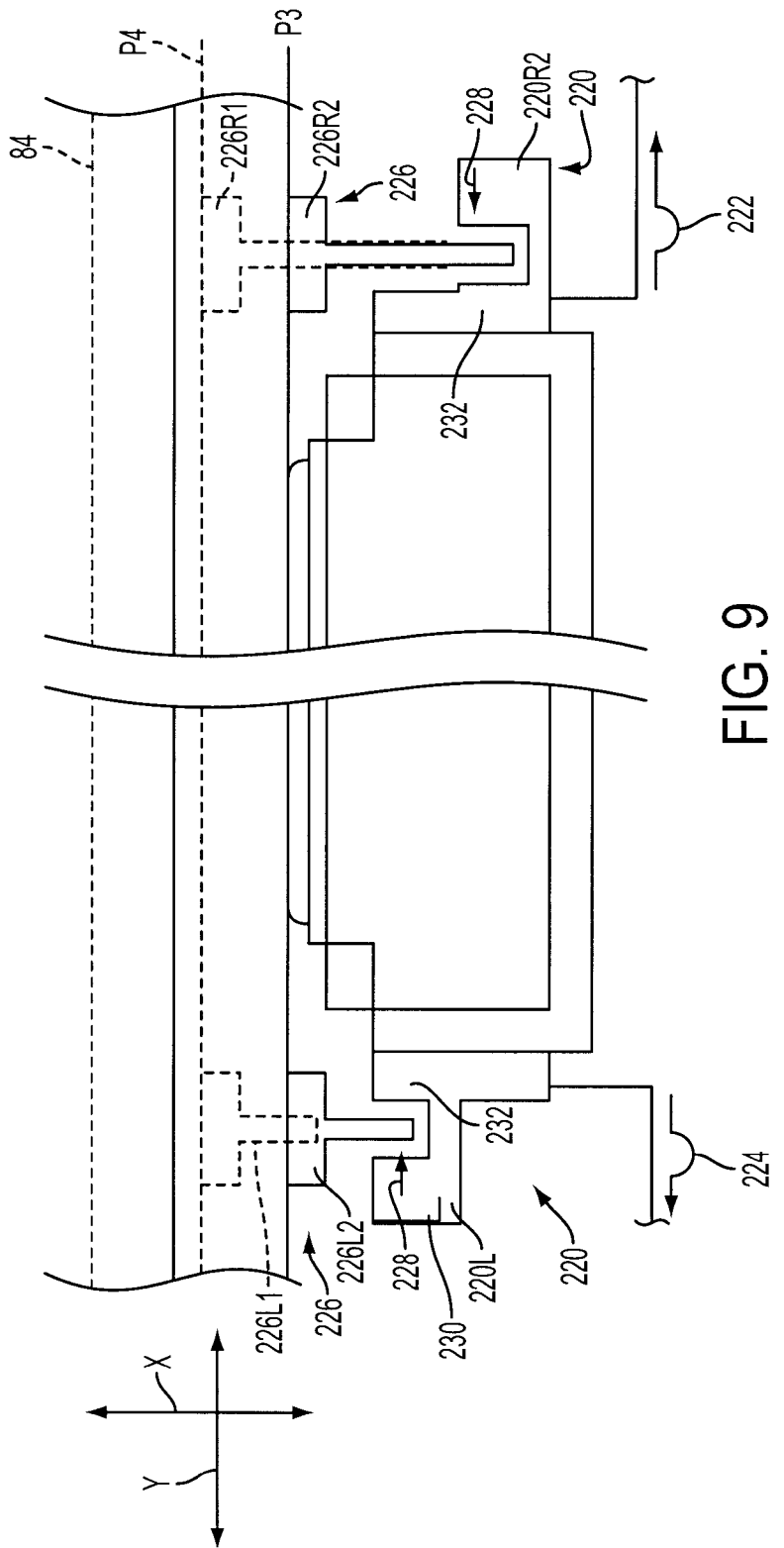
FIG. 9 is a schematic plan view showing an OPEN position of the gate, illustrating corresponding positions of flags that cooperate with respective sensors for determining positions of the gate in opening or closing the opening of the chamber.

FIG. 9 shows one embodiment in which each sensor 220L and 220R is configured with a beam 228, such as an infrared beam, that is directed from one arm 230 to a sensor arm 232. When the beam 228 is uninterrupted and reaches, or is allowed to reach, the sensor arm 232, there is a "make", i.e., the beam is referred to as being "made". When the beam is interrupted and is blocked and does not reach, or is not allowed to reach, the sensor arm 232, there is a "break", i.e., the beam is referred to as being "broken". Each flag 226R and 226L is configured so that at an appropriate time during the gate movement toward or away from the opening 62, the respective flag 226 will either make or break the respective beam 228. For the break function, the flags 226 are made from metal, for example. Moreover, in the configuration of the sensor unit 220, both sensors 220R and 220L are at the same time "inactive", i.e., not generating the respective signal 222 or 224. Also, in that sensor unit configuration, only one of the sensors 220R and 220L is at any time "active", i.e., generating the respective signal 222 or 224.

Generally, in one embodiment, the sensor unit 220 may be configured in two respects, one related to a location of the sensors 220R and 220L on the frame 124, and second, by the length of the flags 226R and 226L extending in the X direction from the gate 84. In this embodiment, FIG. 9 schematically shows the left flag 226L shorter than the right flag 226R. To illustrate flag actuation of the sensors 220, in FIG. 9 the flags 226 are shown schematically, and the flags 226 are shown in two positions. Thus, flag 226R is identified as: (1) 226R1 (corresponding to gate IN) and (2) 226R2 (corresponding to gate OUT); and flag 226L is identified as: (1) 226L1 (corresponding to gate IN) and (2) 226L2 (corresponding to gate OUT). Also, the relative mounting position of the left sensor 220L is such that the left flag 226L just barely breaks the respective beam 228 of the left sensor 220L when the gate is in the gate OPEN position, i.e., gate 84 OPEN. The phrase "just barely breaks" means that the gate 84 must be positioned so that there is the full opening of opening 62 (FIG. 5A). This is shown schematically in FIG. 9 corresponding to flag position 226L2, the corresponding position of the gate 84 is shown in FIG. 5A to the far left in the slot, or groove, 70.

These gate/flag positions must occur before the respective beam 228 will be interrupted ("broken") by the flag 220L.

Thus, with the polarity of the left sensor 220L, when the left sensor beam is broken, the left sensor 220L outputs the gate OUT signal 224 (which is a "high" signal). Correspondingly, the "just barely breaks" configuration means that once the gate 84 has moved a short distance from the gate OPEN position toward the gate CLOSED position (e.g., moved by about 0.25 inches), the flag at position 226L2 will no longer break the respective beam of sensor 220L, and the left beam will be made. With the described polarity, a made beam of sensor 220L ends the gate OUT signal 224, and the signal 224 is "low" (or of zero output value). FIG. 9 thus shows signal 224 "at break left".

In this embodiment, not only is the left flag 226L shorter than the right flag 226R, but the relative mounting position of the right sensor 220R is such that the right flag must travel further inward (toward the opening 62) in order to allow the right beam to be made and the gate IN signal 222 to be output. "Travel further" is with respect to the signal 224 going off. Thus, after the left flag 226L moves toward the opening 62 and the signal 224 ends; the right flag 226R continues to move from position 226R2 toward position 226R1. Flag 226R does not allow the right beam 228 to be made until the gate is at the fully IN position and the flag 226R is at position 226R1. This may be referred to as the flag 226R "just barely makes", and means that the gate 84 must be fully at the IN position shown in FIG. 5B (i.e., to the far right in the slot, or groove, 70) before the respective right beam 228 will not be interrupted ("will be made") by the flag at 226R1. Thus, with the opposite polarity of the right sensor 220R, when the right sensor beam 228 is made, the right sensor 220R outputs the right signal 222 (which is a "high" signal). Correspondingly, the "just barely makes" configuration means that once the gate 84 has moved a short distance from the full IN position toward the gate OPEN position (e.g., moved by about 0.25 inches), the respective beam 228 of sensor 220R will be interrupted ("broken") by the flag 220R, and will no longer be made, so the signal 222 ends. Based on the above descriptions, it may be understood that there is no signal 222 or 224 output during the gate movement that corresponds to the left beam 228 made and the right beam 228 broken. Thus, only at position 226R1 is there signal 222, which is a change of state from both signals off. Also, only at position 226L2 is there signal 224, which is a change of state from both signals off. Also, it may be understood that the sensor unit (e.g., sensor 220L) is configured with the beam 228 that is normally unbroken and the sensor 220L of the sensor unit is configured with a first polarity to prevent generation of the control signal 224 when the beam 228 is unbroken. In further review, the gate valve 50 also includes the flag 226L secured to the gate 84, the flag 226L being configured to break the left beam 228 when the aligned gate 84 is over the groove 70 toward the transfer unit 52 and out of contact with the wall 60 to fully open the opening 62.

Additionally, it may be understood that the second drive 150 is configured to move the aligned gate 84 toward and away from the transfer unit 52 and respectively out of and into contact with the wall 60 to respectively open and close the opening 62. The gate valve 50 may also include the first and second sensors 220 mounted to opposite sides 140 of the frame 124 for respective response to the aligned gate 84 respectively in or out of contact with the wall. The first sensor (e.g., left 220L) is configured with a first beam 228 and with a first polarity. The second sensor (e.g., right 220R) is configured with a second beam 228 and with a polarity opposite to the first polarity. A first flag 226L is secured to the gate 84. The first flag 226L is configured to break the first beam 228 when the aligned gate is over the groove 70 toward the transfer unit 52 and out of contact with the wall 60 to fully open the opening 62. The first sensor 220L is configured to output the first signal 224 when the first beam 228 is broken, the first signal 224 enabling the first drive 90 for moving the distal end 92 to the first position P1 (down). In further review, the first (left) sensor 220L may be mounted on one (left) side of the frame 124 and the second sensor 220R mounted on the other (right) side 140 of the frame 124. With the sensors being of opposite polarity, the second (right) sensor unit is effective upon closure of the opening to output the signal 222 indicating the closure, and the first (left) sensor 220L is effective when the opening is open to output the signal 224 indicating that the opening is open. In another respect, the second (right) sensor 220R may be described as being configured with the second sensor beam 228 and responds to the respective flag 226R making the first beam 228. The second (right) sensor 220R is configured with the second sensor beam 228 and responds to the respective flag 226R breaking the second beam 228.

Figure 10:
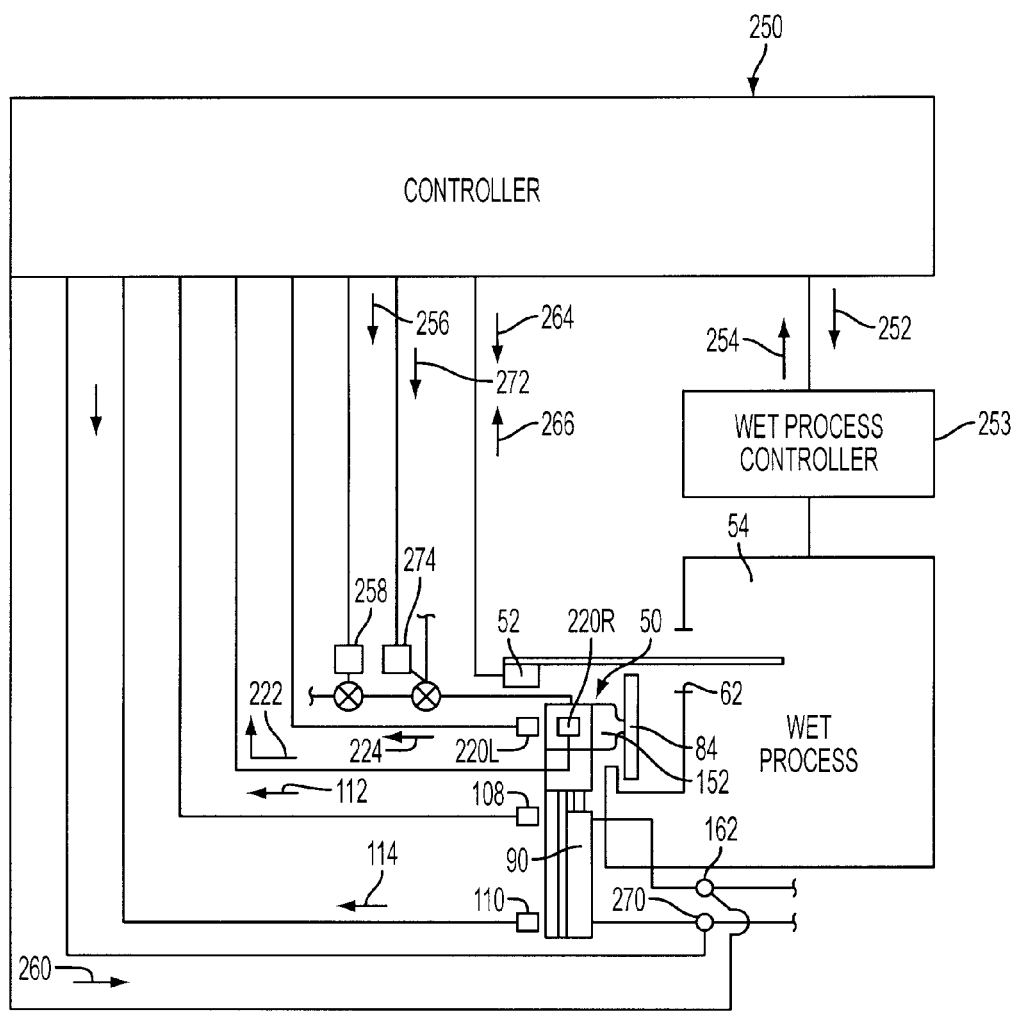
FIG. 10 is a diagram of a controller and connections for applying control signals to the controller and connecting signals to the drives, to a wafer transfer unit, and to the wet process chamber.

Referring to FIG. 10, a controller 250 is shown for sequencing the operations in the wet chamber 54, and of the wafer transfer unit 52, as well as the drives 90 and 150. Controller 250 may, e.g., be a personal computer executing a program that responds to various signals, including the signals 222 and 224 described above. Considering an initial operation for wet processing the wafer 56 in the chamber 54, the controller 250 outputs a process start signal 252. In response, the wet process is performed in the chamber 54 under control of a wet process controller 253. The wet process ends and controller 253 returns a process end signal 254. In response, the controller 250 outputs a signal 256 to initiate movement of the gate 84 to the gate OPEN position (FIG. 5A). In response, a second solenoid controller, or "valve open", unit 258 causes the fluid to bleed from the bladder 152 to atmosphere and the bladder deflates from the sloped shape 161 to the invaginated shape of section 156. The coupler 200 moves left (as viewed in FIG. 5A) causing the gate 84 to move out. The gate 84 moves to the gate OPEN position, the left flag 226L (at position 226L2, FIG. 9) breaks the left beam, causing the left sensor 220L to output the gate OUT signal 224. During the gate movement from the gate CLOSED position (FIG. 5B) the right flag 226R has been moving with the gate 84 from position P4 toward position P3 shown in FIG. 9, such that the right sensor 220R does not output the signal 222. In response to the gate OUT signal 224, the controller 250 outputs a signal 260 to a first drive down controller 162 that causes the gate 84 to move down so the distal end 92 of first drive 90 moves to the first position P1 (FIG. 1). With the gate 84 fully down and clear of the access path 64, magnetic sensor 110 (FIG. 2) senses a gate DOWN position and outputs the signal 114 indicating that the access path 64 is clear. In response to signal 114, the controller 250 outputs a wafer transfer actuation signal 264 to initiate operation of the unit 52. On completion of a wafer transfer cycle (e.g., removal of a processed wafer 56 and return of an unprocessed wafer 56 to the chamber 54), unit 52 causes output of a transfer done signal 266. In response, controller 250 outputs a close gate signal 268. In response, a first drive up controller 270 causes the first drive 90 to move the distal end 92 up, and sensor 108 senses when the end 92 is in the second position. At this time, the gate 84 is aligned with the access path 64 (FIG. 5A) and the sensor 108 outputs the signal 112. In response to signal 112, the controller 250 outputs a "gate move in" signal 272 to initiate closure of the opening 62. In response, a first solenoid controller, or gate valve closer, unit 274 causes pressurized fluid to be applied to bladder 152. Bladder 152 inflates, expanding into the sloped shape 161 having a longer length in the X direction toward the access surface 61 than the shape of section 156. By the above-described operation, and with the standoff assemblies 180 holding the gate 84 parallel to the access surface 61, the gate moves and engages the surface 61 to fully close the opening 60 (FIG. 5B). With the gate 84 at the gate CLOSED position, the right flag 226R at position 226R1 (FIG. 9) stops blocking the right beam (which is made), causing the right sensor 220R to output the gate IN signal 222. FIG. 9 shows that during the gate movement from the gate OPEN position, the left flag 226L has been moving with the gate 84 from position 226L2 toward position 226L1, such that with the polarity of the left sensor 220L, when left beam 228 is made no signal 224 is output. In response to the gate IN signal 222, the controller 250 outputs the start process signal 252. The description of the wet processing cycle is thus complete.

In one embodiment, the controller 250 may be configured so that each of the operations in response to the respective signals must occur within a time period. If the signal corresponding to completion of the operation is not output within the time period, the controller 250 outputs an error message and the process is stopped for review of the situation.

It is to be understood that in addition to the controller 250, aspects of the invention may be practiced with other computer system configurations including hand-held devices, microprocessor systems, microprocessor-based or programmable consumer electronics, minicomputers, mainframe computers and the like. The embodiments may also be practiced in distributing computing environments where tasks are performed by remote processing devices that are linked through a network.

In view of the foregoing description, it may be understood that the gate valve 50 provides apparatus for positioning the gate 84 to open and close the wet process chamber 54 alternately by allowing the wafer transfer unit 52 to access the chamber 54 along the access path 64 that extend from the first location at which the wafer transfer unit 52 is located. Such valve 50 also allows the wet process to be performed in the chamber 54 when the gate 84 is closed.

Also in view of the foregoing description, it may be understood that in the management of wet process materials that may cause contamination outside the chamber 54, the embodiments receive and drain (and thus collect) fluids that may drip from or flow off the gate 84, for example, as the wafer 56 exits the opening 62 from the wet process chamber 54. Such fluids may be described as "wet process residue", and are to be collected rather than dripping outside the chamber 54. The collection by the embodiments results from the gate 84 staying in the fluid collection groove 70 in all positions of the gate, i.e., down and up and open and closed, as described above. Thus, the embodiments overcome the prior problems presented when apparatus for such collecting (i.e., the slot 70) must be adjacent to the access opening 62 in an otherwise flat wall 60 of the wet process chamber 54. Even though the slot 70 reduces an amount of space (dimension 76) otherwise available for gate movement, the embodiments provide a solution to the problem of satisfying the fluid collecting requirement and at the same time effecting gate movement in the available space without interfering with the wafer transfer unit 52. The space 94 between the wafer transfer unit 52 and the drive 90 thus avoids the previous problematic interference.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the embodiments are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention. In the claims, elements and/or steps do not imply any particular order of operation, unless explicitly stated in the claims.

What is claimed is:

1. An apparatus including a gate valve for allowing a workpiece transfer unit to access a wet process chamber, the apparatus comprising:
    a wall configured with an opening through which a workpiece is configured to be moved in and out of the wet process chamber, the wall includes a groove, and a lip;
    a vertical drive positioned beside the wall; and
    a bladder drive connected to the vertical drive, such that the bladder drive is capable of moving vertically between a location in front of the opening and away from the opening, the bladder drive having a gate plate that is configured to be extended toward the wall when placed in front of the opening and filled with fluid, and the gate plate of the bladder drive is configured to retract from the wall when moved away from the opening;
    wherein the groove includes a drain, the drain configured to receive excess fluids from the opening in the wall as resulting from the wet process chamber.

2. The apparatus as recited in claim 1, further comprising a track, the track allowing the vertical drive to move up and down in the vertical direction.

3. The apparatus as recited in claim 2, wherein extending toward the wall provides movement in a horizontal direction.

4. The apparatus as recited in claim 3, wherein the gate plate of the bladder drive retracting from the wall occurs in both the horizontal direction away from the opening and in the vertical direction, so that the bladder drive provides an access path for the workpiece transfer unit.

5. The apparatus as recited in claim 1, wherein the lip defines a containment for the gate plate, such that the containment prevents the gate plate from retracting beyond a distance within the groove of the wall.

6. The apparatus as recited in claim 1, wherein the gate plate provides a sealing surface upon the wall at the location of the opening.

7. A gate valve for interfacing with a wet process chamber, the gate valve comprising:
   a vertical drive positioned beside a wall with an opening that defines an interface between the gate valve and a wet process chamber, such that the wall includes a groove and a lip; and
   a bladder drive connected to the vertical drive, such that the bladder drive is capable of being moved vertically between a location in front of the opening and a location away from the opening, the bladder drive having a gate plate that is configured to be extended toward the wall when placed in front of the opening and filled with a fluid, and the gate plate of the bladder drive is configured to retract from the wall when the fluid is removed from the bladder drive;
   wherein the groove includes a drain, the drain configured to receive excess fluids from the opening in the wall as resulting from the wet process chamber.

8. The gate valve for interfacing with a wet process chamber as recited in claim 7, wherein the bladder drive is moved away from the location of the opening when the workpiece transfer unit is processing movement in or out of the wet process unit.

9. The gate valve for interfacing with a wet process chamber as recited in claim 7, further comprising:
   a track, the track allowing the vertical drive to move up and down in the vertical direction.

10. The gate valve for interfacing with a wet process chamber as recited in claim 9, wherein extending toward the wall provides movement in a horizontal direction.

11. The gate valve for interfacing with a wet process chamber as recited in claim 10, wherein the gate plate of the bladder drive retracting from the wall occurs in both the horizontal direction away from the opening and in the vertical direction, so that the bladder drive provides an access path for the workpiece transfer unit.

12. The gate valve for interfacing with a wet process chamber as recited in claim 7, wherein the lip defines a containment for the gate plate, such that the containment prevents the gate plate from retracting beyond a distance within the groove of the wall.

13. The gate valve for interfacing with a wet process chamber as recited in claim 12, wherein the gate plate provides a sealing surface upon the wall at the location of the opening.

14. The gate valve for interfacing with a wet process chamber as recited in claim 7, wherein the opening defines a path for a workpiece to be moved by a workpiece transfer unit in and out of the wet process chamber.

\* \* \* \* \*